US010235452B1

(12) United States Patent
Savir et al.

(10) Patent No.: US 10,235,452 B1
(45) Date of Patent: Mar. 19, 2019

(54) EXPERT RECOMMENDATION LEVERAGING TOPIC CLUSTERS DERIVED FROM UNSTRUCTURED TEXT DATA

(71) Applicant: EMC Corporation, Hopkinton, MA (US)

(72) Inventors: Amihai Savir, Sansana (IL); Eslam ElNakib, New Cairo (EG); Lina Al Farouk, Nasr (EG); Anat Parush Tzur, Beer-Sheva (IL); Otniel Van-Handel, Modiin Elite (IL); Raphael Cohen, Beer-Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 488 days.

(21) Appl. No.: 14/671,024

(22) Filed: Mar. 27, 2015

(51) Int. Cl.
*G06F 17/30* (2006.01)

(52) U.S. Cl.
CPC .. *G06F 17/30705* (2013.01); *G06F 17/30867* (2013.01)

(58) Field of Classification Search
None
See application file for complete search history.

(56) References Cited

U.S. PATENT DOCUMENTS

| 9,378,200 | B1 * | 6/2016 | Cohen | G06F 17/30731 |
| 9,672,279 | B1 | 6/2017 | Cohen et al. | |
| 2012/0203752 | A1 * | 8/2012 | Ha-Thuc | G06F 17/30705 707/706 |

(Continued)

FOREIGN PATENT DOCUMENTS

| KR | 1020130045425 A | 5/2013 |
| KR | 1020130099423 A | 9/2013 |

OTHER PUBLICATIONS

D. Yimam-Seid et al., "Expert Finding Systems for Organizations: Problem and Domain Analysis and the DEMOIR Approach," Journal of Organizational Computing and Electronic Commerce, Mar. 2003, pp. 1-24, vol. 13, No. 1.

(Continued)

*Primary Examiner* — Ashish Thomas
*Assistant Examiner* — Abdullah A Daud
(74) *Attorney, Agent, or Firm* — Ryan, Mason & Lewis, LLP

(57) ABSTRACT

An apparatus comprises a processing platform configured to implement an expert recommender engine. The expert recommender engine receives information relating to a communication from a user device, and identifies at least one subject matter expert for the communication based on the received information and unstructured text data of a service events database. The expert recommender engine is associated with a clustering module that separates the unstructured text data into topic clusters. The expert recommender engine comprises a collaborative filtering module that receives the topic clusters from the clustering module and utilizes the topic clusters to identify the subject matter expert. The user device is connected with an expert device corresponding to the identified subject matter expert. The expert recommender engine may utilize structured data, social media data and customer satisfaction survey data in combination with the received information and the topic clusters to identify the subject matter expert.

20 Claims, 5 Drawing Sheets

(56) References Cited

U.S. PATENT DOCUMENTS

| | | | | |
|---|---|---|---|---|
| 2012/0246153 | A1* | 9/2012 | Pehle | G06F 17/30864 707/723 |
| 2013/0159325 | A1 | 6/2013 | Polonsky et al. | |
| 2013/0262083 | A1* | 10/2013 | Hershey | G06F 17/2785 704/9 |
| 2014/0330773 | A1* | 11/2014 | Brillhart | G06Q 30/0203 707/609 |
| 2014/0337005 | A1* | 11/2014 | Abdel-Hady | G06F 17/20 704/2 |
| 2014/0375749 | A1* | 12/2014 | Kay | H04M 3/5315 348/14.03 |
| 2015/0032751 | A1* | 1/2015 | Ting | G06F 17/30598 707/738 |
| 2016/0203209 | A1* | 7/2016 | Clinchant | G06F 17/30707 707/738 |
| 2017/0193080 | A1* | 7/2017 | Pidduck | G06F 17/30722 |
| 2017/0286535 | A1* | 10/2017 | Krusell | G06Q 10/10 |

OTHER PUBLICATIONS

Raymond J. D'Amore, "Expert Finding in Disparate Environments," University of Sheffield, Mar. 2008, 283 pages, Sheffield, United Kingdom.

M.D. Ekstrand et al., "Collaborative Filtering Recommender Systems," Foundations and Trends in Human-Computer Interaction, Feb. 2011, pp. 81-173, vol. 4, No. 2.

T.W. Jackson et al., "Review of Knowledge Extraction from Email: The Boundaries of Natural Language Processing Techniques," Information & Communication Systems, May 2011, 6 pages.

Mark T. Maybury, "Expert Finding Systems," MITRE Center for Integrated Intelligence Systems, MITRE Technical Report No. MTR 06B000040, Sep. 2006, 64 pages.

G. Vadivelou et al., "Collaborative Filtering Based Hybrid Approach for Web Service Recommendations," Research Journal of Applied Sciences, Engineering and Technology, Aug. 2014, pp. 615-622, vol. 8, No. 5.

A. Nenkova et al., "The Impact of Frequency on Summarization," Microsoft Research, Tech. Rep. MSR TR-2005-101, Jan. 2005, 8 pages.

H. Daumé III et al., "Bayesian Query-Focused Summarization," Proceedings of the 21st International Conference on Computational Linguistics and 44th Annual Meeting of the ACL, Jul. 2006, pp. 305-312, Sydney, Australia.

J.M. Conroy et al., "CLASSY Query-Based Multi-Document Summarization," Proceedings of the 2005 Document Understanding Workshop, Oct. 2005, 9 pages.

T. Baumel et al., "Query-Chain Focused Summarization," Proceedings of the 52nd Annual Meeting of the Association for Computational Linguistics, Jun. 2014, pp. 913-922, vol. 1.

G. Erkan et al., "LexRank: Graph-Based Lexical Centrality as Salience in Text Summarization," Journal of Artificial Intelligence Research, Dec. 2004, pp. 457-479, vol. 22.

R. Cohen, "Towards Understanding of Medical Hebrew," Thesis, Ben-Gurion University of the Negev, Nov. 2012, 127 pages.

P.F. Brown et al., "Class-Based n-gram Models of Natural Language," Association for Computation Linguistics, 1992, pp. 467-479, vol. 18, No. 4.

S. Banerjee et al., "The Design, Implementation and Use of the Ngram Statistics Package," Proceedings of the 4th International Conference on Computational Linguistics and Intelligent Text Processing (CICLing), 2003, pp. 370-381.

R. Cohen et al., "Redundancy in Electronic Health Record Corpora: Analysis, Impact on Text Mining Performance and Mitigation Strategies," BMC Bioinformatics, Apr. 2013, pp. 1-15, vol. 14, No. 10.

D.M. Blei et al., "Latent Dirichlet Allocation," Journal of Machine Learning Research, Jan. 2003, pp. 993-1022, vol. 3.

A.K. McCallum, "Mallet: A Machine Learning for Language Toolkit," 2002, 2 pages.

H.M. Wallach et al., "Rethinking LDA: Why Priors Matter," Advances in Neural Information Processing Systems 22: 23rd Annual Conference on Neural Information Processing Systems, Dec. 2009, 9 pages, Vancouver, British Columbia, Canada.

\* cited by examiner

EXPERT RECOMMENDATION LEVERAGING TOPIC CLUSTERS DERIVED FROM UNSTRUCTURED TEXT DATA

FIELD

The field relates generally to information processing systems, and more particularly to techniques for identifying subject matter experts in conjunction with processing of service requests or other communications.

BACKGROUND

In many information processing systems, service event analysis relies heavily on inefficient manual activities. For example, it is common in some systems for service personnel to be required to complete forms describing problems experienced by customers and the manner in which these problems were resolved. These forms often utilize static sets of predetermined problem and resolution codes that, in the interest of convenience to the service personnel, tend to be overly general and vague.

Supplementary unstructured text data added to such forms is often ignored as it requires special treatment. For example, the unstructured text data may require manual screening in which a corpus of unstructured text data is reviewed and sampled by service personnel. Alternatively, the unstructured text data may require manual customization and maintenance of a large set of rules that can be used to determine correspondence with predefined themes of interest. Such processing is unduly tedious and time-consuming, particularly for large volumes of unstructured text data.

As a result of these and other difficulties in processing unstructured text data associated with service events, such unstructured text data is generally not taken into account in typical conventional implementations of system functions such as selection of subject matter experts for handling service requests. Conventional expert selection therefore often relies on expert skills databases or rules-based selection approaches that involve significant manual intervention and are unduly burdensome to maintain.

SUMMARY

Illustrative embodiments of the present invention provide expert recommender engines that operate on topic clusters generated from unstructured service event data from a service events database. The expert recommender engines in some embodiments also utilize structured service event data from the service events database, as well as other types of data such as social media data and customer satisfaction survey data.

In one embodiment, an apparatus comprises a processing platform configured to implement an expert recommender engine. The expert recommender engine is configured to receive information relating to a communication from a user device, and to identify at least one subject matter expert for the communication based on the received information and unstructured text data of a service events database. The expert recommender engine is associated with a clustering module configured to separate the unstructured text data into topic clusters. The expert recommender engine comprises a collaborative filtering module configured to receive the topic clusters from the clustering module and to utilize the topic clusters to identify the subject matter expert. The user device is connected with an expert device corresponding to the identified subject matter expert.

As indicated above, the expert recommender engine can be further configured to utilize one or more of structured data, social media data and customer satisfaction survey data in combination with the received information and the topic clusters to identify the subject matter expert.

The unstructured text data in some embodiments illustratively comprises unstructured service request summaries. For example, the unstructured service request summaries may comprise problem summaries and corresponding solution summaries relating to respective service events.

The illustrative embodiments provide a number of significant advantages relative to the conventional arrangements described previously. For example, these embodiments can significantly reduce time to resolution of a given service request by avoiding situations in which the service request is serially routed to multiple subject matter experts before an optimal subject matter expert is located.

In addition, there is no need to continuously expand and update an expert skills database. Instead, unstructured text data is automatically processed using text analytics to facilitate the determination of an appropriate subject matter expert in a fully automated manner and therefore without any need for manual intervention.

Accordingly, these embodiments can avoid the need for manual screening in which a corpus of unstructured text data is reviewed and sampled by service personnel.

Moreover, the expert recommender engines in the illustrative embodiments are data driven in that relevant topics are elevated automatically from the actual unstructured text data itself rather than determined by attempting to impose a limited set of predefined themes on the unstructured text data. As a result, there is no need for manual customization and maintenance of a large set of rules that can be used to determine correspondence with predefined themes of interest. For example, the illustrative embodiments do not require rule updates to accommodate previously unseen terms appearing in unstructured text data.

These and other illustrative embodiments described herein include, without limitation, apparatus, systems, methods and processor-readable storage media.

DETAILED DESCRIPTION

Illustrative embodiments of the present invention will be described herein with reference to exemplary information processing systems and associated processing platforms each comprising one or more processing devices. It is to be appreciated, however, that the invention is not restricted to use with the particular illustrative system, platform and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
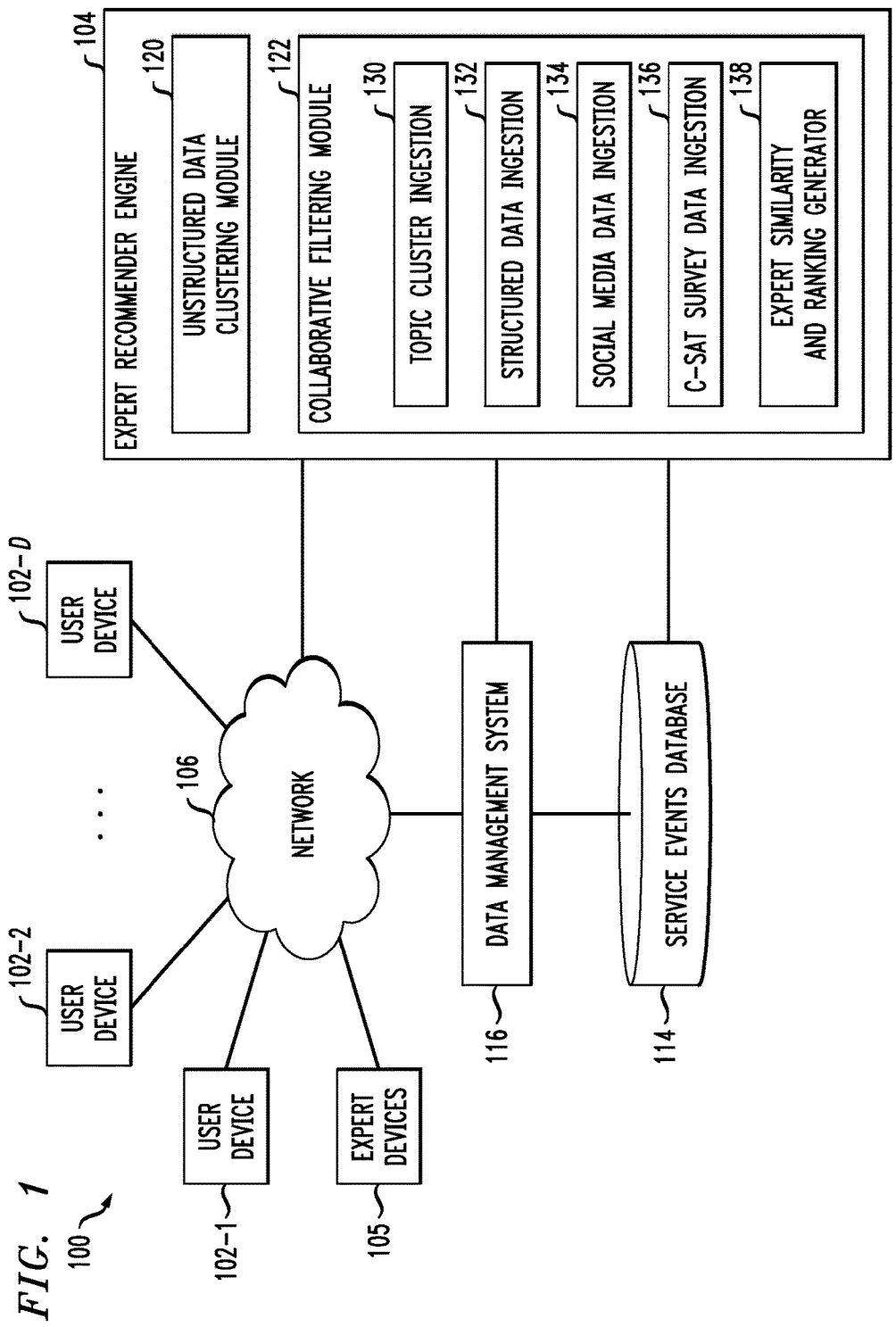
FIG. 1 is a block diagram of an information processing system that includes an expert recommender engine for identifying a subject matter expert in an illustrative embodiment of the invention.

FIG. 1 shows an information processing system 100 configured in accordance with an illustrative embodiment of the present invention. The information processing system 100 is assumed to be built on at least one processing platform and provides an expert recommender engine that in the present embodiment utilizes cluster labeling functionality. The cluster labeling functionality can be provided in conjunction with other types of related functionality, such as content inference functionality of a content inference system that incorporates or is otherwise associated with a cluster labeling system. A given expert recommender engine as disclosed herein may therefore be part of or otherwise associated with another system, such as a cluster labeling system or a content inference system.

The information processing system 100 in this embodiment illustratively comprises a plurality of user devices 102-1, 102-2, . . . 102-D, an expert recommender engine 104 and a set of expert devices 105, all of which are coupled to and communicate over a network 106. The expert recommender engine 104 utilizes topic clusters derived from unstructured service event data to facilitate connection of particular ones of the user devices 102 to particular ones of the expert devices 105. The expert recommender engine 104 may also utilize one or more additional types of data in its determination of a subject matter expert for use in processing a given communication from a user device, such as structured service event data, social media data and customer satisfaction data.

The expert recommender engine 104 is coupled to a service events database 114. The service events database 114 in the present embodiment is assumed to store both structured and unstructured service event data. It is to be appreciated that the service events database 114 may comprise a combination of multiple separate databases, such as separate databases for respective structured and unstructured service event data. Such multiple databases may be co-located within a given data center or other facility or geographically distributed over multiple distinct facilities. Numerous other combinations of multiple databases each containing portions of at least one of structured and unstructured service event data can be used in implementing the service events database 114.

The structured service event data illustratively comprises service event data stored in one or more structured data fields of the service events database 114, and the unstructured service event data illustratively includes documents comprising unstructured text data of the service events database 114. More particularly, the unstructured service event data in the present embodiment is assumed to comprise unstructured text data in the form of multiple documents each relating to one or more service events arising within the system 100 or within associated systems not explicitly shown.

By way of example, in an embodiment in which the system 100 is implemented by or on behalf of a customer-facing business such as a customer support organization, the structured and unstructured service event data can comprise large amounts of information regarding customer interaction. The structured service event data in this context may comprise structured information about the customer, support personnel involved in each case, locations, dates, times to resolution, product types and problem codes. The unstructured service event data in this context may comprise manual textual information entered by support engineers or help desk assistants. This may include a description of the problem (e.g., a problem summary or problem description), the steps taken to correct the problem (e.g., a resolution summary) or the entire customer interaction (e.g., chat or call transcripts). Numerous other types of structured and unstructured service event data can be used in other embodiments.

The service events database 114 illustratively comprises one or more storage disks, storage arrays, electronic memories or other types of memory, in any combination. Although shown as separate from the expert recommender engine 104 in FIG. 1, the service events database 114 in other embodiments can be at least partially incorporated within the expert recommender engine 104, or within one or more other system components.

The documents stored in the service events database 114 need not be in any particular format or formats, but generally comprise unstructured text data, possibly stored in combination with other types of data such as structured text data. Moreover, a given set of documents subject to processing in embodiments of the invention can illustratively include documents of a variety of different formats. The term "document" as used herein is therefore intended to be broadly construed.

In the present embodiment, the expert recommender engine 104 and the service events database 114 are associated with a data management system 116. The expert recommender engine 104 can communicate directly with the service events database 114 and the data management system 116, and additionally or alternatively can communicate with these system components via the network 106.

The data management system 116 coordinates storage of structured and unstructured service event data in the service events database 114, as well as provisioning of portions of that data to the expert recommender engine 104 as needed for processing. It is also possible for the expert recommender engine 104 to provide data directly to, and retrieve data directly from, the service events database 114.

The expert recommender engine 104 in the present embodiment is separated into a plurality of functional modules, including an unstructured data clustering module 120 and a collaborative filtering module 122.

The unstructured data clustering module 120 operates on unstructured service event data from the service events database 114. For example, the module 120 is illustratively configured to assign each of a plurality of documents of the unstructured service event data to one or more of a plurality of clusters corresponding to respective topics. The topics can be identified at least in part from the unstructured text data of those documents using at least one topic model provided by a topic model generator.

Although the clustering module 120 in the FIG. 1 embodiment is shown as being implemented within the expert recommender engine 104, in other embodiments the clustering module 120 can be implemented at least in part externally to the expert recommender engine. For example, module 120 can be implemented in a related system, such as a cluster labeling system or a content inference system.

The expert recommender engine 104 in the present embodiment is configured to receive information relating to a communication from a given one of the user devices 102, such as a user device associated with a customer or a support person, and to identify at least one subject matter expert for the communication based on the received information and unstructured text data of the service events database 114. As indicated previously, the unstructured text data illustratively comprises a plurality of documents associated with respective previous service requests, such as unstructured service request summaries including one or more problem summaries and one or more corresponding solution summaries, although other types of data can be used in conjunction with the unstructured text data, including structured service event data, social media data and customer satisfaction survey data. The communication from the given user device 102 may also comprise a service request.

The unstructured data clustering module 120 is operative to separate the unstructured text data into topic clusters by assigning each of the corresponding documents to one or more of the topic clusters. In assigning documents to clusters, the clustering module 120 in some embodiments utilizes natural language processing techniques described in more detail elsewhere herein so as to permit related documents not sharing any common technical phrases to be assigned to the same topic cluster.

The collaborative filtering module 122 is operative to receive the topic clusters from the clustering module 120 via a topic cluster ingestion module 130 and to utilize the topic clusters to identify the subject matter expert. The identification of the subject matter expert in the present embodiment is assumed to be performed by the expert similarity and ranking generator 138 based on at least the received information relating to the communication and the topic clusters from the clustering module 120. For example, the expert similarity and ranking generator 138 may be configured to determine one or more of the topic clusters that are most closely related to the received information and to utilize the determined one or more topic clusters to identify the subject matter expert. The given user device 102 associated with the communication is then connected with a particular one of the expert devices 105 corresponding to the identified subject matter expert.

The expert similarity and ranking generator 138 in some embodiments takes additional data into account in processing the received information and the topic clusters to identify the subject matter expert.

For example, structured service event data from the service events database 114 can be obtained via the structured data ingestion module 132 and utilized in combination with the received information and the topic clusters to identify the subject matter expert. Such structured data illustratively comprises service event data stored in one or more structured data fields of the service events database.

As another example, social media data can be obtained via the social media data ingestion module 134 and utilized in combination with the received information and the topic clusters to identify the subject matter expert.

As yet another example, customer satisfaction survey data can be obtained via the customer satisfaction survey data ingestion module 136 and utilized in combination with the received information and the topic clusters to identify the subject matter expert. The customer satisfaction survey data is also referred to herein as C-SAT data.

In some embodiments, the collaborative filtering module 122 utilizes all of the above-noted different types of data, namely, unstructured service event data, structured service event data, social media data and customer satisfaction survey data, in combination with the received information relating to the communication, to identify a subject matter expert for the communication.

The expert recommender engine may additionally or alternatively be configured to generate a ranked listing of subject matter experts and to identify an available subject matter expert from the ranked listing. The given user device 102 is then connected with the expert device 105 corresponding to the available subject matter expert.

The expert recommender engine 104 can include additional or alternative components in other embodiments. For example, the expert recommender engine can include a labeling interface permitting entry of a label for a selected cluster. In addition, the expert recommender engine 104 can be configured to update the service events database 114 to indicate a given user-entered label for the selected cluster. In such an arrangement, a subject matter expert associated with one of the expert devices 105 can enter labels for selected clusters in conjunction with operation of the clustering module 120. Accordingly, the system 100 can be configured in some embodiments to allow a subject matter expert to accurately label clusters of documents with relative ease and speed. After labels are assigned to multiple clusters of documents, additional analysis or other processing can be performed, possibly involving the subject matter expert. The service events database 114 is then updated to indicate the label.

A given subject matter expert can be at least partially automated. Accordingly, the term "subject matter expert" as used herein is intended to be broadly construed, and should not be viewed as being limited to human experts.

It should be noted that different arrangements of one or more ingestion modules can be used in other embodiments. For example, in possible alternative embodiments, the collaborative filtering module 122 illustratively comprises only a subset of the ingestion modules 130, 132, 134 and 136.

It is also possible that the expert recommender engine can include a visualization module configured with one or more view generators. Visualizations generated by the view generators can be delivered to a given one of the expert devices 105 in conjunction with a connection of that expert device to a particular user device.

The visualization module may be configured to provide an output display showing at least a subset of the various visualizations generated by the view generators, as well as any additional or alternative visualizations. The output display illustratively comprises one of a plurality of user interface displays that are generated under the control of the visualization module and presented on a display screen of a given processing device, such as one of the expert devices 105. For example, a given expert device may comprise a computer, mobile telephone or other type of processing device adapted for communication with the expert recommender engine 104 over the network 106. Accordingly, one or more visualizations may be generated and transmitted to the expert device of the identified subject matter expert in conjunction with connection of a user device to the expert device.

Examples of possible view generators that can be included in a given embodiment include a bigram view generator configured to provide a visualization of a plurality of term pairs from a selected cluster, a summarization view generator configured to provide a visualization of representative term sequences from the selected cluster, and unigram and aggregate probability view generator configured to provide a visualization of a plurality of individual terms from the selected cluster with the aggregate probability comprising a combination of individual probabilities that respective ones of the terms appear in the selected cluster.

The individual terms may comprise respective words, the term pairs may comprise respective word pairs, and the term sequences may comprise respective sentences each having three or more words. However, other types of terms, term pairs and term sequences can be used in other embodiments. Also, phraseology such as "word" and "sentence" as used herein is intended to be broadly construed, and should not be viewed as requiring strict conformance to particular languages, grammatical constructs, etc.

The above-noted bigram view generator is illustratively configured to order the term pairs from the selected cluster based at least in part on pointwise mutual information (PMI) gain. As a more particular example, the bigram view generator can initially order the term pairs based on PMI gain and then reorder the ordered term pairs based on frequency of occurrence in the selected cluster.

The above-noted summarization view generator is illustratively configured to identify the representative term sequences from the selected cluster using an automatic summarization algorithm. Examples of automatic summarization algorithms that may be used in generating the summarization visualization include SumBasic, BayesSum and Classy.

Additional details regarding these and other exemplary summarization techniques suitable for use in embodiments of the invention are disclosed in, for example, A. Nenkova et al., "The Impact of Frequency on Summarization," MSR-TR-2005-101, 2005; H. Daume et al., "Bayesian Query-Focused Summarization," Proceedings of the 21st International Conference on Computational Linguistics, Sydney, Australia, July 2006, pp. 305-312; J. M. Conroy et al., "CLASSY Query-Based Multi-Document Summarization," Proceedings of the Document Understanding Conf. Wksp. 2005 (DUC 2005) at the Human Language Technology Conf./Conf. on Empirical Methods in Natural Language Processing (HLT/EMNLP); T. Baumel et al., "Query-Chain Focused Summarization," ACL (1) 2014: 913-922; and G. Erkan et al., "LexRank: Graph-based Lexical Centrality as Salience in Text Summarization," Journal of Artificial Intelligence Research (MIR) 22.1 (2004): 457-479, which are incorporated by reference herein.

The expert recommender engine 104 can include one or more additional modules, such as a preprocessing module for applying preprocessing operations such as data indexing and dictionary generation to unstructured text data. Alternatively, such a preprocessing module can be implemented in a related content inference system that incorporates or is otherwise associated with the expert recommender engine or a corresponding cluster labeling system.

By way of example, a preprocessing module of the type described above illustratively comprises a data indexer and a dictionary generator.

The data indexer is configured to process unstructured text data of one or more documents obtained from the service events database 114 in order to construct a term index for at least a given one of the documents. The unstructured text data illustratively comprises unstructured service request summaries, such as problem summaries and corresponding solution summaries, relating to service events. In some embodiments, the unstructured text data has structured data associated therewith in the service events database 114 and the term index is based on both the unstructured text data and the associated structured data. Examples of structured data include indications of region, team, etc.

The dictionary generator is configured to process one or more term indexes generated by the data indexer in order to construct one or more in-domain dictionaries. In this context, the term "in-domain" refers to a domain comprising specified unstructured text data of one or more documents, although other types of domains can be used in other embodiments. The dictionary generator is illustratively configured to implement automatic lemmatization and synonym extraction, but in other embodiments different types of dictionary generators may be used.

Additional details regarding exemplary dictionary generation techniques that may be utilized in embodiments of the present invention can be found in R. Cohen, "Towards Understanding of Medical Hebrew," Dissertation, Ben-Gurion University of the Negev, 2012; P. F. Brown et al., "Class-based n-gram models of natural language," Computational Linguistics 18.4 (1992): 467-479; and S. Banerjee et al., "The design, implementation, and use of the ngram statistics package," Computational Linguistics and Intelligent Text Processing 2003:370-381, which are incorporated by reference herein.

As mentioned above, the expert recommender engine 104 can include or be otherwise associated with a topic model generator. The topic model generator may be configured to process one or more in-domain dictionaries in order to construct at least one topic model. In the present embodiment, it is assumed that the topic model generator in generating the topic model utilizes latent Dirichlet allocation (LDA) with asymmetric priors, although other techniques can be used, including, for example, probabilistic latent semantic analysis (pLSA), canonical-correlation analysis (CCA), or combinations of these and other topic modeling algorithms. The topic model generator illustratively provides lists of topics at least a subset of which are elevated as respective sets of related terms from the unstructured text data.

Examples of topic modeling algorithms suitable for use in the expert recommender engine 104 in embodiments of the present invention are disclosed in, for example, R. Cohen et al., "Redundancy in electronic health record corpora: analysis, impact on text mining performance and mitigation strategies," BMC Bioinformatics 2013, 14:10; D. M. Blei et al., "Latent dirichlet allocation," The Journal of Machine Learning Research 2003, 3:993-1022; A. K. McCallum, "Mallet: A machine learning for language toolkit," 2002; and H. Wallach et al., "Rethinking LDA: Why priors matter," Advances in Neural Information Processing Systems 2009, 22:1973-1981, which are incorporated by reference herein.

The service events database 114 may be updated to indicate the assignment of one or more topics to a given document. Such a topic assignment is an example of what is more generally referred to herein as a "content inference." As mentioned previously, the expert recommender engine 104 in some embodiments is incorporated in or otherwise associated with a content inference system.

The expert recommender engine 104 is advantageously data driven in that relevant topics are elevated automatically from the actual unstructured text data itself rather than determined by attempting to impose a limited set of pre-defined themes on the unstructured text data. Accordingly, the expert recommender engine 104 considerably facilitates processing of large volumes of unstructured text data, and in particular the problem and resolution summaries that are common to service requests. As a result, subject matter experts can be more accurately and efficiently identified using the disclosed techniques.

The expert recommender engine 104 in the illustrative embodiments does not characterize individual system users but instead models unstructured text data of one or more documents from the service events database 114. By way of example, such an arrangement allows particularly efficient analysis of overall customer interactions with a corporate or enterprise support organization.

It is to be appreciated that the particular arrangement of system components illustrated in FIG. 1 is exemplary only, and that numerous other arrangements of components may be used in other embodiments. For example, in other embodiments, functionality described herein as being associated with one or more of the unstructured data clustering module 120 and collaborative filtering module 122 may be implemented at least in part using additional or alternative components of the system 100.

The expert recommender engine 104, and possibly other related components of system 100 such as the service events database 114, are assumed in the present embodiment to be implemented on a given processing platform using at least one processing device comprising a processor coupled to a memory.

The processor may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. These and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, or a wide variety of other types of computer program products. The term "article of manufacture" as used herein is intended to be broadly construed, but should be understood to exclude transitory, propagating signals.

The one or more processing devices implementing the expert recommender engine 104, and possibly other components of system 100, may each further include a network interface that allows such components to communicate with one another over one or more networks. For example, a given such network interface illustratively comprises network interface circuitry that allows at least one of the modules 120 and 122 to communicate over a network with other components of the system 100 such as user devices 102, expert devices 105, service events database 114 and data management system 116. Such network interface circuitry may comprise, for example, one or more conventional transceivers.

The above-noted network may comprise, for example, a global computer network such as the Internet, a wide area network (WAN), a local area network (LAN), a satellite network, a telephone or cable network, a cellular network, a wireless network such as a WiFi network or a WiMAX network, or various portions or combinations of these and other types of networks.

At least a portion of the expert recommender engine 104, and possibly other system components, may comprise software that is stored in a memory and executed by a processor of at least one processing device.

Processing devices comprising processors, memories and network interfaces as described above are illustratively part of a processing platform comprising physical and virtual resources in any combination. Additional examples of such processing platforms that may be used to implement at least portions of the system 100 will be described in more detail below in conjunction with FIGS. 5 and 6.

Again, it should be understood that the particular sets of components implemented in the information processing system 100 as illustrated in FIG. 1 are presented by way of example only. In other embodiments, only subsets of these components, or additional or alternative sets of components, may be used, and such components may exhibit alternative functionality and configurations. Examples of other system embodiments will be described below in conjunction with FIGS. 3 and 4.

The operation of the information processing system 100 will now be further described with reference to the flow diagram of FIG. 2, which illustrates an exemplary process carried out by the system 100 in one embodiment. The process as shown includes steps 200 through 208. Steps 200 through 208 are assumed to be performed primarily by the expert recommender engine 104, but one or more of these steps may be performed at least in part by or in conjunction with other system components in other embodiments. Moreover, expert recommendation functionality as disclosed herein should not be viewed as being limited in any way to this particular illustrative arrangement of process steps.

In step 200, information relating to a communication from a user device is received. The user device illustratively comprises one of the user devices 102 of system 100. Such a user device may correspond, for example, to a computer, mobile phone or other device associated with a customer, a support person or any other user that may have a need for a subject matter expert to assist in processing of the communication. As a more particular example, the communication may comprise a service request received from a customer or a service request that a support person is in the process of handling.

In step 202, unstructured text data is obtained from a service events database. The unstructured text data illustratively comprises a plurality of documents associated with respective previous service requests. For example, the unstructured text data may comprise unstructured service request summaries including one or more problem summaries and one or more corresponding solution summaries.

As mentioned previously, various preprocessing steps may be applied to the unstructured text data. For example, one or more term indexes may be constructed, possibly in the form of a document term matrix, or in another suitable format. Also, associated structured data may be taken into account in generating the one or more term indexes. One or more in-domain dictionaries may then be constructed based on the term index, possibly using automatic lemmatization and synonym extraction.

In step 204, the unstructured text data is separated into topic clusters. This operation is illustratively performed by the unstructured data clustering module 120 of the system 100. For example, the clustering module 120 may be configured to assign each of the documents to one or more of the topic clusters.

In some embodiments, the clustering module 120 is configured to assign the documents to the topic clusters in a manner that permits documents not sharing any common technical phrases to be assigned to the same topic cluster. Such an arrangement allows service events with similar topics to be grouped together into a single topic cluster even if no words are shared. For example, different service event documents may refer to service event resolution using different terms such as "code upgrade," "hot fix," "hotfix" and "code bug fix" that all describe the same or similar solution. The clustering module 120 is configured to permit such service event documents to be grouped based on relationships identified between their respective unstructured text data. As indicated previously, this grouping in some embodiments may involve use of natural language processing techniques.

The topics may be identified from the unstructured text data using one or more topic models. Such topic models can be constructed by a topic model generator of the clustering module 120 or by an associated cluster labeling system or content inference system. By way of example, a given such topic model can be constructed based on one or more of the above-noted in-domain dictionaries, possibly using LDA with asymmetric priors. Additionally or alternatively, one or more other topic modeling algorithms such as pLSA or CCA may be used.

It is possible in this illustrative embodiment that a given document can be assigned to multiple clusters, such as two or three different clusters. The clusters in this embodiment are therefore examples of what are referred to herein as "soft" clusters. In other embodiments, the expert recommender engine 104 may be configured in some modes of operation such that each document can only be assigned to a single cluster, resulting in what are referred to herein as "hard" clusters.

In step 206, the received information and the topic clusters are utilized to identify at least one subject matter expert for the communication. This operation is illustratively performed by the collaborative filtering module 122 of the system 100. For example, the collaborative filtering module 122 may be configured to determine one or more of the topic clusters that are most closely related to the received information and to utilize the determined one or more topic clusters to identify the subject matter expert.

The collaborative filtering module 122 obtains the topic clusters from the clustering module 120 via the topic cluster ingestion module 130 and processes the received information and the topic clusters in the expert similarity and ranking generator 138 to identify the subject matter expert. For example, this may involve determining the topic clusters that are most closely associated with the received information of the current communication and then identifying particular subject matter experts having experience or other expertise that is most similar to the identified topic cluster or clusters. In such an arrangement, the communication is determined to be associated with one or more topic clusters and then the subject matter expert is identified based on the one or more topic clusters.

Identification of the subject matter expert by the collaborative filtering module 122 of the expert recommender engine 104 may involve use of structured data of the service events database 114. Such structured data is obtained by the collaborative filtering module 122 via the structured data ingestion module 132 and illustratively comprises service event data stored in one or more structured data fields of the service events database 114. The collaborative filtering module 122 is configured to obtain this structured data of the service events database and to utilize the structured data in combination with the received information and the topic clusters to identify the subject matter expert.

The collaborative filtering module 122 in some embodiments obtains additional or alternative data for use in the subject matter expert identification. Such additional or alternative data can be obtained via the ingestion modules 134 and 136.

For example, the collaborative filtering module 122 is illustratively configured to obtain social media data via the ingestion module 134 and to utilize the social media data in combination with the received information and the topic clusters to identify the subject matter expert.

As another example, the collaborative filtering module 122 is illustratively configured to obtain customer satisfaction survey data via the ingestion module 136 and to utilize the customer satisfaction survey data in combination with the received information and the topic clusters to identify the subject matter expert.

The expert recommender engine 104 in some embodiments utilizes the expert similarity and ranking generator 138 of the collaborative filtering module 122 to generate a ranked listing of subject matter experts and to identify a particular available subject matter expert from the ranked listing. The rankings of the subject matter experts are illustratively based on similarities between the current service event and previous service events involving those experts as determined using the topic clusters and any additional structured data, social media data or customer satisfaction survey data. Determination of such similarities may be based at least in part on one or more information retrieval techniques, such as term frequency-inverse document frequency (TF-IDF), relevance information retrieval, the probabilistic relevance model and other information retrieval models.

In step 208, the user device is connected with an expert device corresponding to the identified subject matter expert. For example, the identified subject matter expert may comprise the highest-ranking available subject matter expert from a ranked listing as generated by the expert similarity and ranking generator 138. Alternatively, only a single subject matter expert may be identified rather than a ranked listing of subject matter experts, and the user device connected with the correspond expert device of the identified subject matter expert. As indicated above, a given subject matter expert as that term is broadly utilized herein may comprise an at least partially automated subject matter expert.

Steps 200 through 208 can be repeated as needed to process additional service requests or other communications from respective user devices.

Figure 2:
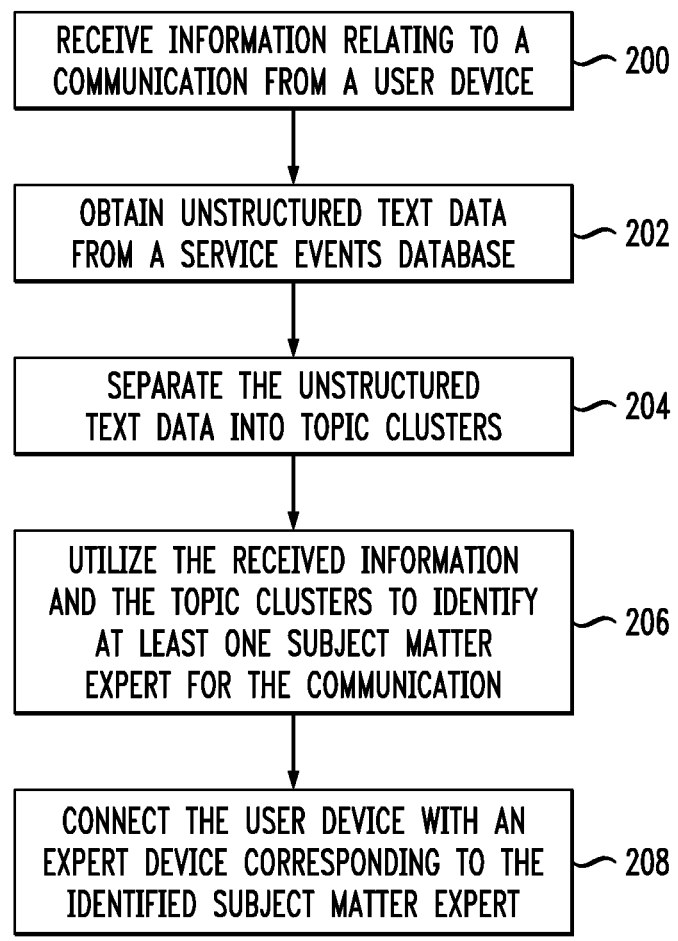
FIG. 2 is a flow diagram of an exemplary process implemented in the information processing system of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations for implementing an expert recommender engine or portions thereof. For example, the ordering of the process steps may be varied in other embodiments, or certain steps may be performed concurrently with one another rather than serially.

It is to be appreciated that expert recommendation functionality such as that described in conjunction with the flow diagram of FIG. 2 can be implemented at least in part in the form of one or more software programs stored in memory and executed by a processor of a processing device such as a computer or a virtual machine. As mentioned previously, a memory or other storage device having such program code embodied therein is an example of what is more generally referred to herein as a "processor-readable storage medium."

In addition, as noted above, the configuration of information processing system 100 is exemplary only, and numerous other system configurations can be used in implementing an expert recommender engine as disclosed herein.

As additional examples, other information processing systems implementing expert recommender engines will now be described in conjunction with FIGS. 3 and 4.

Figure 3:
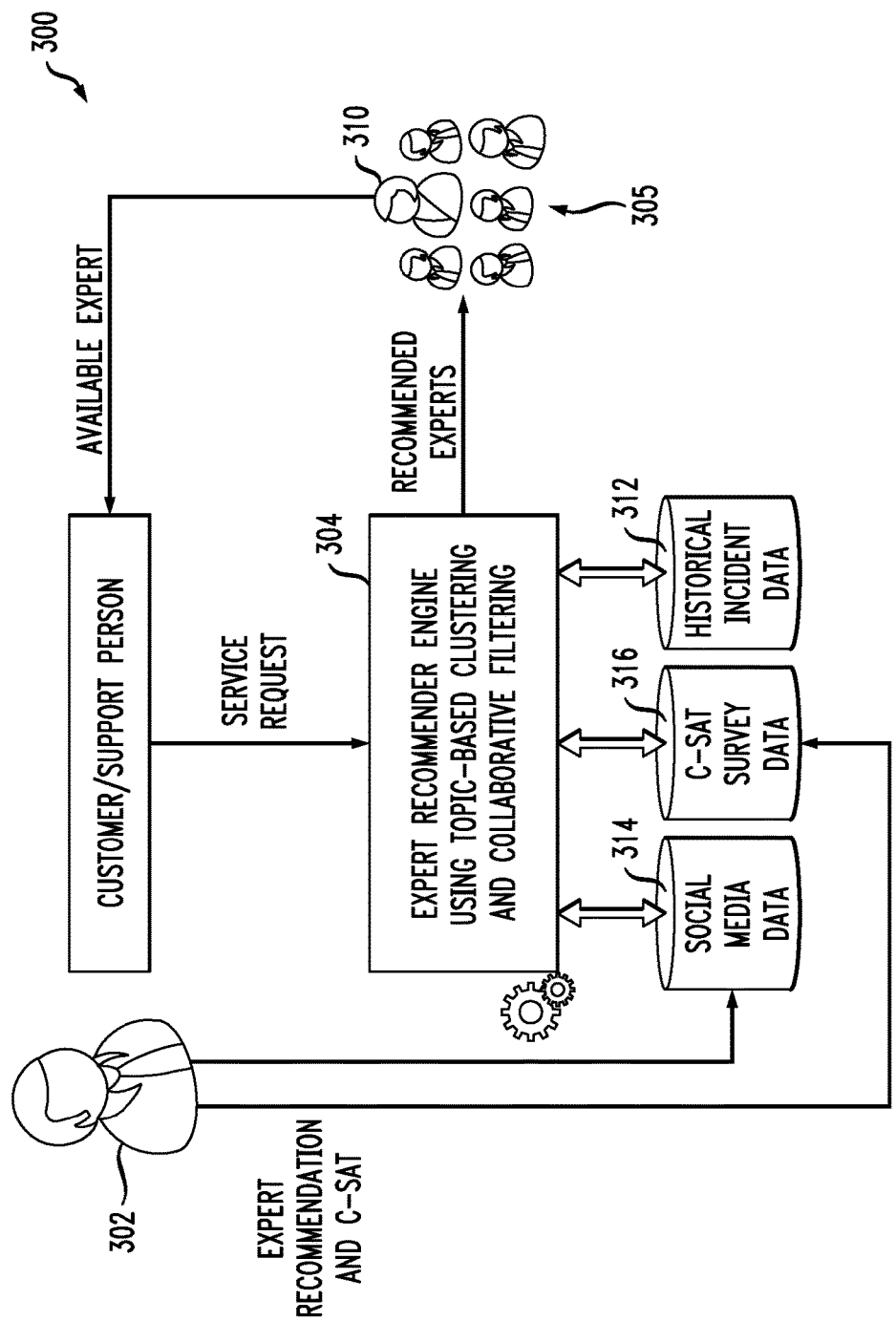
FIGS. 3 and 4 illustrate the operation of expert recommender engines in other information processing system embodiments.

Referring now to FIG. 3, an information processing system 300 comprises a customer or support person 302 that generates a service request submitted for processing to an expert recommender engine 304. The customer or support person is an example of what is more generally referred to herein as a "user" and in the present embodiment is assumed to be associated with a corresponding user device not explicitly shown in this figure. The expert recommender engine 304 implements topic-based clustering and collaborative filtering of the type previously described in conjunction with the embodiments of FIGS. 1 and 2.

The customer or support person 302 generating the service request is connected by the expert recommender engine 304 to a particular one of the plurality of recommended experts 305, such as a highest-ranking one of the recommended experts 305 that is also determined to be a currently-available expert 310.

The expert recommender engine 304 in this embodiment performs topic-based clustering and collaborative filtering utilizing historical incident data 312, social media data 314 and customer satisfaction survey data 316 to process the service request so as to identify an appropriate subject matter expert. These different types of data may all be derived from a common service events database or from separate databases accessible to the expert recommender engine 304, possibly via one or more data management systems. The historical incident data 312 is assumed to comprise both unstructured text data and structured text data, relating to previous service requests or other communications handled by the system 300. The unstructured text data is processed by the topic-based clustering function of the expert recommender engine 304 in order to associate corresponding documents of the unstructured text data with particular topic clusters. The topic clusters are then used in the collaborative filtering function of the expert recommender engine 304 to facilitate identification of an appropriate subject matter expert for the current service request.

The social media data 314 comprises social media recommendations at least a portion of which have been previously generated by the customer or support person 302 or other system users. The social media data 314 can be further updated if the handling of the current service request by the available subject matter expert 310 leads to a social media recommendation of that expert by the customer or support person 302.

Similarly, the customer satisfaction survey data 316 comprises customer satisfaction survey results at least a portion of which have been previously generated by the customer or support person 302 or other system users. The customer satisfaction survey data 316 can be further updated if the handling of the current service request by the available subject matter expert 310 leads to entry of additional customer satisfaction survey data relating to that expert by the customer or support person 302.

Figure 4:
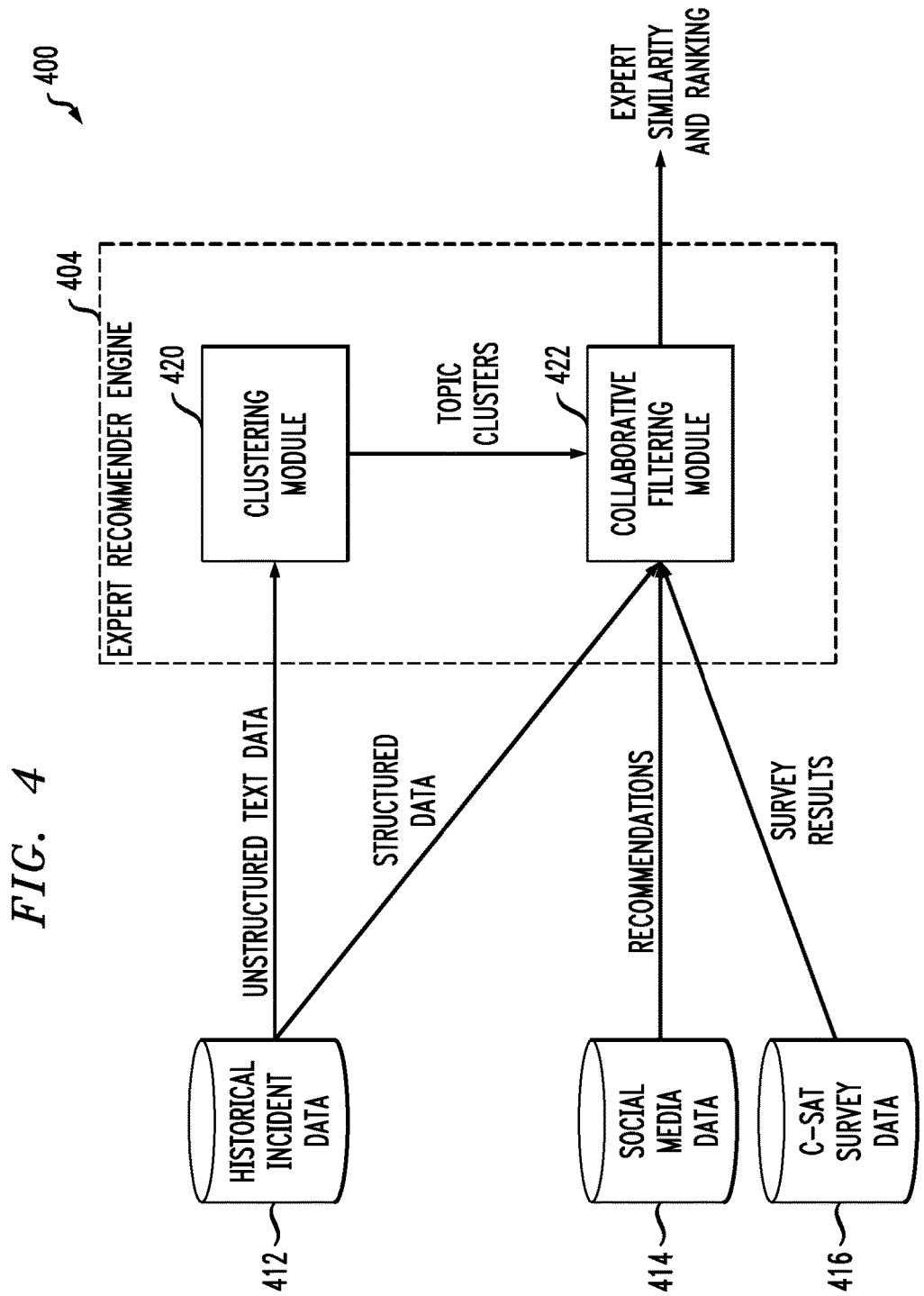

FIG. 4 shows another information processing system 400 that includes an expert recommender engine 404. This system is similar in configuration to the FIG. 3 system in that the expert recommender engine 404 operates using a combination of historical incident data 412, social media data 414 and customer satisfaction survey data 416.

The expert recommender engine 404 includes a clustering module 420 and a collaborative filtering module 422. The clustering module operates on unstructured text data of the historical incident data 412 and generates corresponding topic clusters. These topic clusters are delivered to the collaborative filtering module 422 and utilized in combination with structured data of the historical incident data 412, recommendations from the social media data 414, and survey results from the customer satisfaction survey data 416, to generate expert similarity measures and rankings for handling of a current service request or other communication.

In operation, the system 400 receives a service request from a customer, support person or other user. Such a service request is in some cases accompanied by a problem summary or other unstructured text data description. A list of similar service events can be queried from the historical incident data 412. Topic-based clustering is applied to the resulting unstructured text documents by the clustering module 420 and supplied to the collaborative filtering module 422. The topic clusters are used in conjunction with additional data including structured data, social media data and customer satisfaction survey data to rank subject matter experts by their relation to the service events deemed most similar to the current service request. A list of the ranked experts and their contact details may be provided. A highest-ranking available one of the experts is selected to handle the current service request and the corresponding user device is connected with the appropriate expert device. After the interaction, the user may recommend the expert via social media or customer satisfaction survey, with the corresponding set of data 414 or 416 being updated accordingly.

It should be understood that the particular systems 300 and 400 illustrated in FIGS. 3 and 4 are presented by way of example only, and should not be construed as limiting the scope or functionality of the expert recommender engine in any way.

The illustrative embodiments provide a number of significant advantages relative to conventional arrangements. For example, these embodiments can significantly reduce time to resolution of a given service request by avoiding situations in which the service request is serially routed to multiple subject matter experts before an optimal subject matter expert is located. These embodiments avoid the need to continuously expand and update an expert skills database, while also avoiding the need for maintenance of a rules database for rules-based expert assignment. In a given embodiment, experts do not need to keep and update profiles. Instead, unstructured text data is automatically processed using text analytics to facilitate the determination of an appropriate subject matter expert. No manual effort is needed to maintain the classification of experts based on unstructured text data and supplementary data such as structured text data, social media data and customer satisfaction survey data.

As indicated previously, the expert recommender engines in illustrative embodiments are data driven in that relevant topics are elevated automatically from the actual unstructured text data itself rather than determined by attempting to impose a limited set of predefined themes on the unstructured text data.

The illustrative embodiments therefore advantageously avoid the need for manual screening in which a corpus of unstructured text data is reviewed and sampled by service personnel.

Furthermore, there is no need for manual customization and maintenance of a large set of rules that can be used to determine correspondence with predefined themes of interest. For example, the illustrative embodiments do not require rule updates to accommodate previously unseen terms appearing in unstructured text data.

It is to be appreciated that the foregoing advantages are illustrative of advantages provided in certain embodiments, and need not be present in other embodiments.

It was noted above that portions of the information processing system 100 may be implemented using one or more processing platforms. A given such processing platform comprises at least one processing device comprising a processor coupled to a memory, and the processing device may be implemented at least in part utilizing one or more virtual machines, containers or other virtualization infrastructure.

Illustrative embodiments of such platforms will now be described in greater detail. Although described in the context of system 100, these processing platforms may also be used to implement at least portions of other information processing systems in other embodiments of the invention, such as systems 300 and 400 of FIGS. 3 and 4, respectively.

Figure 5:
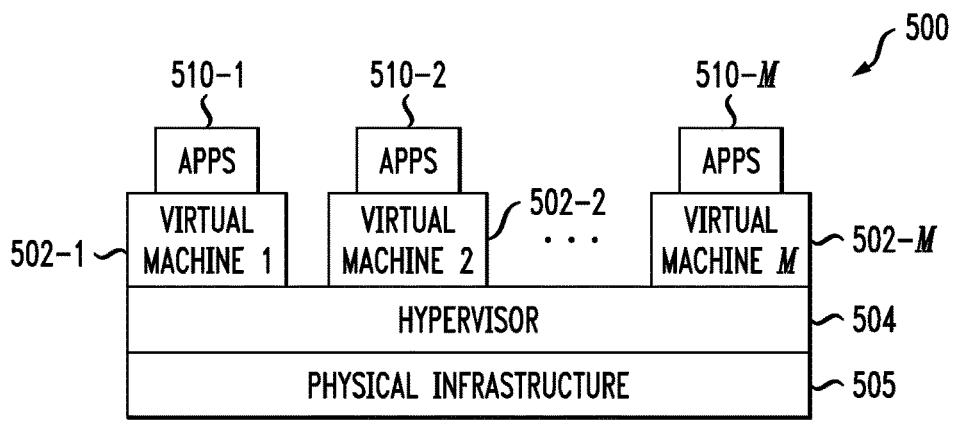
FIGS. 5 and 6 show examples of processing platforms that may be utilized to implement at least a portion of one or more of the information processing systems of FIGS. 1, 3 and 4.

As shown in FIG. 5, portions of the information processing system 100 may comprise cloud infrastructure 500. The cloud infrastructure 500 comprises virtual machines (VMs) 502-1, 502-2, . . . 502-M implemented using a hypervisor 504. The hypervisor 504 runs on physical infrastructure 505. The cloud infrastructure 500 further comprises sets of applications 510-1, 510-2, . . . 510-M running on respective ones of the virtual machines 502-1, 502-2, . . . 502-M under the control of the hypervisor 504.

Although only a single hypervisor 504 is shown in the embodiment of FIG. 5, the system 100 may of course include multiple hypervisors each providing a set of virtual machines using at least one underlying physical machine. For example, different sets of virtual machines provided by respective ones of multiple hypervisors may be utilized in configuring multiple instances of clustering module 120, collaborative filtering module 122 or other components of the system 100.

An example of a commercially available hypervisor platform that may be used to implement hypervisor 504 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system 100.

The cloud infrastructure 500 in FIG. 5 can additionally or alternatively be implemented using other types of virtualization techniques, such as Docker containers or other types of containers.

Figure 6:
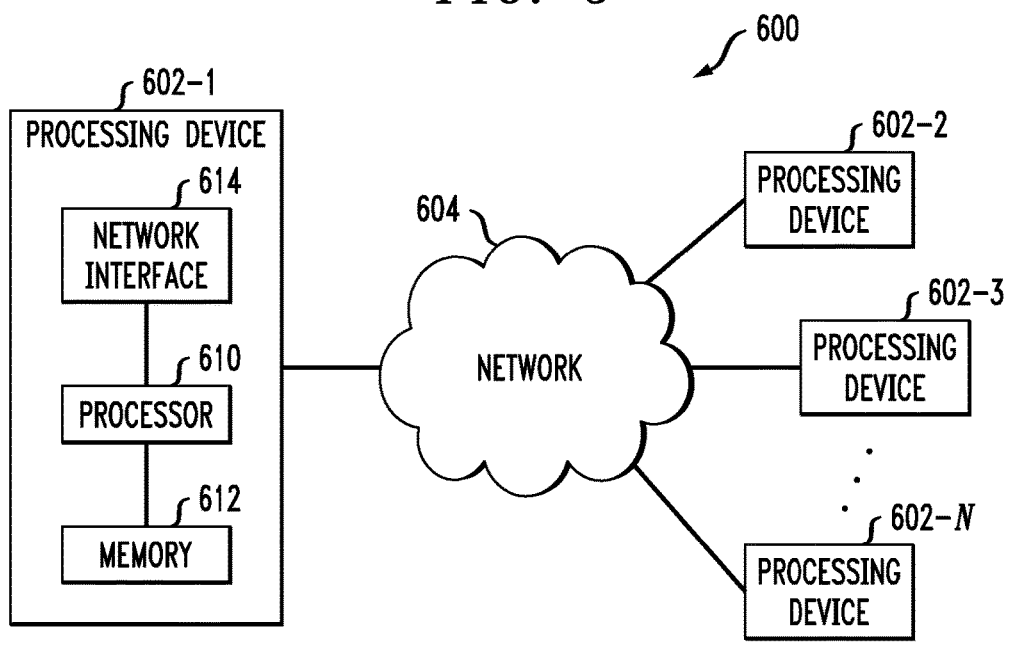

Another example of a processing platform suitable for use in some embodiments is processing platform 600 shown in FIG. 6. The processing platform 600 in this embodiment is assumed to comprise at least a portion of system 100 and includes a plurality of processing devices, denoted 602-1, 602-2, 602-3, . . . 602-N, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an ASIC, an FPGA, or other type of processing circuitry, as well as portions or combinations of such circuitry elements.

The memory 612 may comprise RAM, ROM or other types of memory, in any combination. As mentioned previously, the memory 612 and other memories disclosed herein should be viewed as illustrative examples of what are more generally referred to as "processor-readable storage media" storing executable program code of one or more software programs, and articles of manufacture comprising such processor-readable storage media are considered embodiments of the present invention.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. An apparatus comprising:
a processing platform comprising one or more processing devices each comprising a processor coupled to a memory;
the processing platform being configured:
to receive information relating to a communication from a user device, the communication comprising a service request;
to identify at least one subject matter expert for the communication based on the received information and unstructured text data of a service events database, the unstructured text data comprising a plurality of documents associated with previous service requests, the plurality of documents comprising at least one unstructured service request summary comprising one or more problem summaries and one or more corresponding solution summaries;

to separate the unstructured text data into topic clusters for a plurality of topics, at least a subset of the plurality of topics being determined automatically from the unstructured text data without reference to a set of rules characterizing predefined topics; and to connect the user device with an expert device corresponding to the identified subject matter expert wherein determining at least the subset of the plurality of topics automatically from the unstructured text data without reference to a set of rules characterizing predefined topics comprises:

processing the unstructured service request summaries of the plurality of documents to construct a term index of terms utilized in the unstructured service request summaries;

generating, for a domain comprising the unstructured service request summaries of the plurality of documents, an in-domain dictionary by processing the term index utilizing automatic lemmatization and synonym extraction;

constructing a topic model by processing the in-domain dictionary; and determining a list of topics utilizing the topic model, wherein the list of topics comprises at least one topic elevated as a set of related terms from the unstructured request summaries of the plurality of documents;

wherein connecting the user device with the expert device corresponding to the identified subject matter expert further comprises delivering one or more visualizations to the expert device, the one or more visualizations comprising at least one of:

a bigram view visualization of a plurality of term pairs from a selected topic cluster;

a summarization view visualization of representative term sequences from the selected topic cluster; and a unigram and aggregate probability view visualization of a plurality of individual terms from the selected topic cluster, the aggregate probability comprising a combination of individual probabilities that respective ones of the terms appear in the selected topic cluster.

2. The apparatus of claim 1 wherein the user device comprises a device associated with one of a customer and a support person.

3. The apparatus of claim 1 wherein the processing platform is configured to assign each of the documents to one or more of the topic clusters.

4. The apparatus of claim 3 wherein the processing platform is configured to assign the documents to the topic clusters in a manner that permits documents not sharing any common technical phrases to be assigned to the same topic cluster.

5. The apparatus of claim 1 wherein the processing platform is configured to determine one or more of the topic clusters that are most closely related to the received information and to utilize the determined one or more topic clusters to identify the subject matter expert.

6. The apparatus of claim 1 wherein the processing platform is configured to obtain structured data of the service events database and to utilize the structured data in combination with the received information and the topic clusters to identify the subject matter expert, and wherein the structured data comprises service event data stored in one or more structured data fields of the service events database.

7. The apparatus of claim 1 wherein the processing platform is configured to obtain social media data and to utilize the social media data in combination with the received information and the topic clusters to identify the subject matter expert.

8. The apparatus of claim 1 wherein the processing platform is configured to obtain customer satisfaction survey data and to utilize the customer satisfaction survey data in combination with the received information and the topic clusters to identify the subject matter expert.

9. The apparatus of claim 1 wherein the processing platform is configured to generate a ranked listing of subject matter experts and to identify an available subject matter expert from the ranked listing, and wherein the user device is connected with the expert device corresponding to the available subject matter expert.

10. An information processing system comprising the apparatus of claim 1.

11. A method comprising:

receiving information relating to a communication from a user device, the communication comprising a service request;

obtaining unstructured text data from a service events database, the unstructured text data comprising a plurality of documents associated with previous service requests, the plurality of documents comprising at least one unstructured service request summary comprising one or more problem summaries and one or more corresponding solution summaries;

separating the unstructured text data into topic clusters for a plurality of topics, at least a subset of the plurality of topics being determined automatically from the unstructured text data without reference to a set of rules characterizing predefined topics;

utilizing the received information and the topic clusters to identify at least one subject matter expert for the communication; and connecting the user device with an expert device corresponding to the identified subject matter expert;

wherein the receiving, obtaining, separating, utilizing and connecting are performed by a processing platform comprising one or more processing devices;

wherein determining at least the subset of the plurality of topics automatically from the unstructured text data without reference to a set of rules characterizing predefined topics comprises:

processing the unstructured service request summaries of the plurality of documents to construct a term index of terms utilized in the unstructured service request summaries;

generating, for a domain comprising the unstructured service request summaries of the plurality of documents, an in-domain dictionary by processing the term index utilizing automatic lemmatization and synonym extraction;

constructing a topic model by processing the in-domain dictionary; and determining a list of topics utilizing the topic model, wherein the list of topics comprises at least one topic elevated as a set of related terms from the unstructured request summaries of the plurality of documents;

wherein connecting the user device with the expert device corresponding to the identified subject matter expert further comprises delivering one or more visualizations to the expert device, the one or more visualizations comprising at least one of:
  a bigram view visualization of a plurality of term pairs from a selected topic cluster;
  a summarization view visualization of representative term sequences from the selected topic cluster; and
  a unigram and aggregate probability view visualization of a plurality of individual terms from the selected topic cluster, the aggregate probability comprising a combination of individual probabilities that respective ones of the terms appear in the selected topic cluster.

12. The method of claim 11 wherein separating the unstructured text data into topic clusters comprises assigning each of the documents to one or more of the topic clusters.

13. The method of claim 11 wherein utilizing the received information and the topic clusters to identify at least one subject matter expert further comprises at least one of:
  obtaining structured data of the service events database and utilizing the structured data in combination with the received information and the topic clusters to identify the subject matter expert wherein the structured data comprises service event data stored in one or more structured data fields of the service events database;
  obtaining social media data and utilizing the social media data in combination with the received information and the topic clusters to identify the subject matter expert; and
  obtaining customer satisfaction survey data and utilizing the customer satisfaction survey data in combination with the received information and the topic clusters to identify the subject matter expert.

14. A non-transitory processor-readable storage medium having program code of one or more software programs embodied therein, wherein the program code when executed by at least one processing device of a processing platform causes the processing device:
  to receive information relating to a communication from a user device, the communication comprising a service request;
  to obtain unstructured text data from a service events database, the unstructured text data comprising a plurality of documents associated with previous service requests, the plurality of documents comprising at least one unstructured service request summary comprising one or more problem summaries and one or more corresponding solution summaries;
  to separate the unstructured text data into topic clusters for a plurality of topics, at least a subset of the plurality of topics being determined automatically from the unstructured text data without reference to a set of rules characterizing predefined topics;
  to utilize the received information and the topic clusters to identify at least one subject matter expert for the communication; and
  to connect the user device with an expert device corresponding to the identified subject matter expert;

wherein determining at least the subset of the plurality of topics automatically from the unstructured text data without reference to a set of rules characterizing predefined topics comprises:
  processing the unstructured service request summaries of the plurality of documents to construct a term index of terms utilized in the unstructured service request summaries;
  generating, for a domain comprising the unstructured service request summaries of the plurality of documents, an in-domain dictionary by processing the term index utilizing automatic lemmatization and synonym extraction;
  constructing a topic model by processing the in-domain dictionary; and
  determining a list of topics utilizing the topic model, wherein the list of topics comprises at least one topic elevated as a set of related terms from the unstructured request summaries of the plurality of documents;

wherein connecting the user device with the expert device corresponding to the identified subject matter expert further comprises delivering one or more visualizations to the expert device, the one or more visualizations comprising at least one of:
  a bigram view visualization of a plurality of term pairs from a selected topic cluster;
  a summarization view visualization of representative term sequences from the selected topic cluster; and
  a unigram and aggregate probability view visualization of a plurality of individual terms from the selected topic cluster, the aggregate probability comprising a combination of individual probabilities that respective ones of the terms appear in the selected topic cluster.

15. The processor-readable storage medium of claim 14 wherein the storage medium comprises at least one of an electronic memory and a storage disk.

16. The processor-readable storage medium of claim 14 wherein the program code when executed by at least one processing device further causes said processing device:
  to obtain at least one of structured data, social media data and customer satisfaction survey data; and
  to utilize the obtained data in combination with the received information and the topic clusters to identify the subject matter expert.

17. The apparatus of claim 3 wherein the processing platform is configured to update the service events database to indicate the assignment of each of the documents to one or more of the topic clusters.

18. The apparatus of claim 1 wherein the service request of the received communication is associated with a given user, and wherein the plurality of documents comprise documents associated with previous service requests from a plurality of users including at least one user other than the given user.

19. The apparatus of claim 1 wherein constructing the topic model comprises utilizing latent Dirichlet allocation (LDA) with asymmetric priors.

20. The apparatus of claim 1 wherein constructing the topic model comprises utilizing at least one of probabilistic latent semantic analysis (pLSA) and canonical-correlation analysis (CCA).

* * * * *